United States Patent
Kirk et al.

(10) Patent No.: US 10,375,087 B2
(45) Date of Patent: Aug. 6, 2019

(54) SECURITY ARCHITECTURE FOR THE CONNECTED AIRCRAFT

(71) Applicant: Honeywell International Inc., Morristown, NJ (US)

(72) Inventors: James C. Kirk, Clarksville, MD (US); Daniel P. Johnson, Fridley, MN (US); Joseph J. Palovick, III, Moorestown, NJ (US); Dewey Mann, Albuquerque, NM (US); Derick Lucas Gerlock, Albuquerque, NM (US)

(73) Assignee: Honeywell International Inc., Morris Plains, NJ (US)

( * ) Notice: Subject to any disclaimer, the term of this patent is extended or adjusted under 35 U.S.C. 154(b) by 910 days.

(21) Appl. No.: 14/336,230

(22) Filed: Jul. 21, 2014

(65) Prior Publication Data

US 2017/0302684 A1    Oct. 19, 2017

(51) Int. Cl.
*H04L 29/06* (2006.01)
*H04L 29/08* (2006.01)
*H04W 12/08* (2009.01)

(52) U.S. Cl.
CPC ........ *H04L 63/1416* (2013.01); *H04L 63/101* (2013.01); *H04L 63/105* (2013.01); *H04W 12/0806* (2019.01); *G06F 2221/2113* (2013.01); *H04L 63/1408* (2013.01); *H04L 67/12* (2013.01)

(58) Field of Classification Search
CPC ......... H04L 63/08; H04L 63/10; H04L 63/20; H04W 12/06; H04W 12/08
See application file for complete search history.

(56) References Cited

U.S. PATENT DOCUMENTS

| | | |
|---|---|---|
| 6,801,769 B1 | 10/2004 | Royalty |
| 7,756,145 B2 | 7/2010 | Kettering et al. |
| 8,341,298 B2 | 12/2012 | Wilber et al. |

(Continued)

FOREIGN PATENT DOCUMENTS

| | | |
|---|---|---|
| EP | 2454309 | 5/2009 |
| WO | 2007050164 | 5/2007 |
| WO | 2009151854 | 12/2009 |

OTHER PUBLICATIONS

Mils-Based Information Flow Control in the Avionic Domain: A Case Study on Compositional Architecture and Verification (Year: 2012).*

(Continued)

*Primary Examiner* — Yonas A Bayou
(74) *Attorney, Agent, or Firm* — Bookoff McAndrews, PLLC

(57) ABSTRACT

Systems and methods of a security architecture for a connected aircraft are disclosed. In at least one embodiment, an avionics server comprises a plurality of device ports, wherein each of the plurality of device ports is coupled to a respective one of a plurality of device network interface cards and dedicated to a respective one of a plurality of avionics domains which corresponds to the respective device network interface card. Further, at least one processing device is configured to identify one or more signals from a respective user received at one or more of the plurality of device ports and to verify whether the user has access to the respective avionics domains that are dedicated to the one or more device ports over which the one or more signals are received.

20 Claims, 2 Drawing Sheets

(56) References Cited

U.S. PATENT DOCUMENTS

Figure 1:
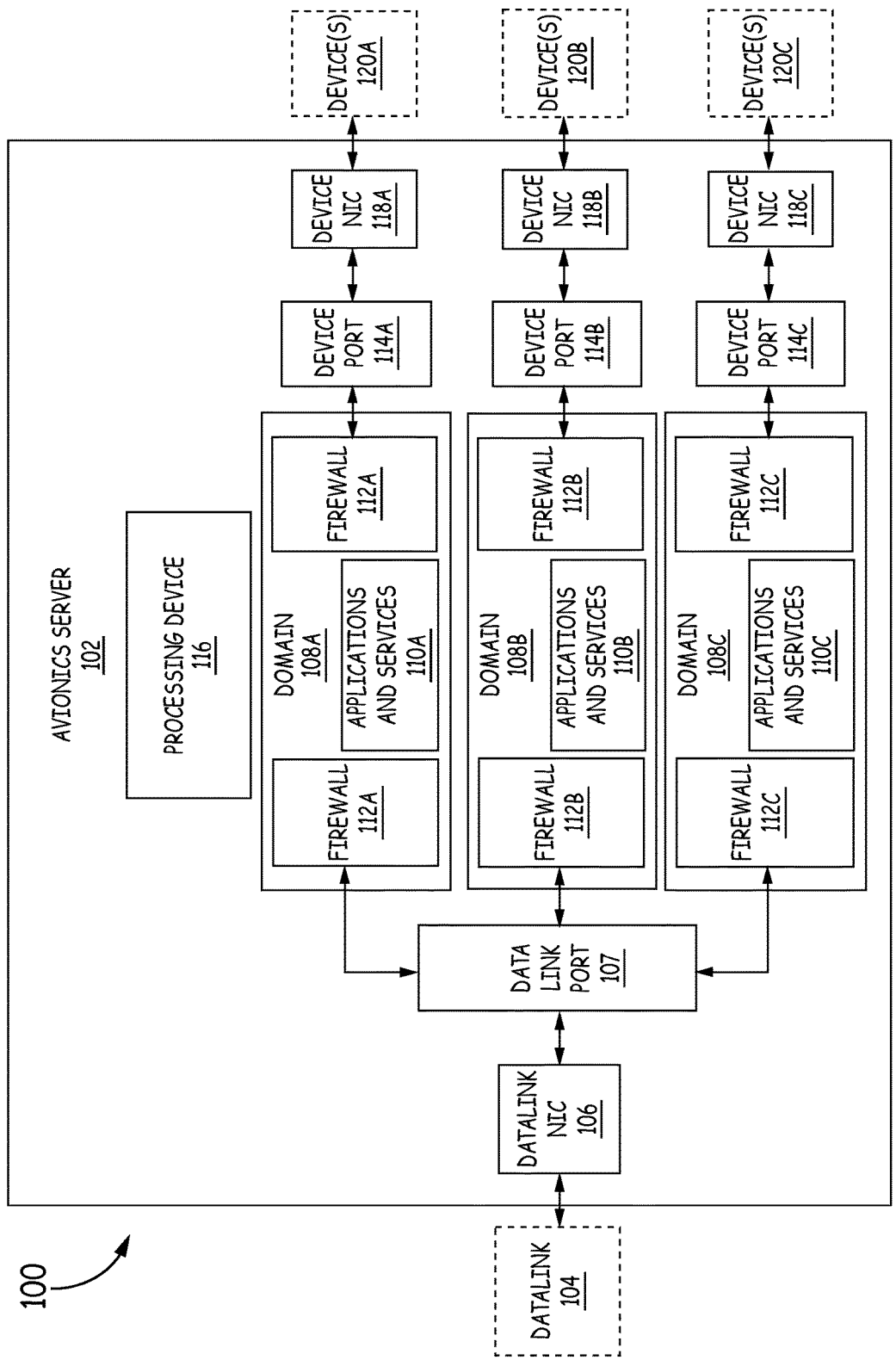

| | | | |
|---|---|---|---|
| 8,392,534 B2 | 3/2013 | Causse et al. | |
| 8,478,997 B2 | 7/2013 | Lapp et al. | |
| 8,527,714 B2 | 9/2013 | Labarre et al. | |
| 2002/0032766 A1* | 3/2002 | Xu | H04L 29/06 709/223 |
| 2002/0032797 A1* | 3/2002 | Xu | H04L 29/06 709/238 |
| 2002/0035639 A1* | 3/2002 | Xu | H04L 29/06 709/238 |
| 2002/0038339 A1* | 3/2002 | Xu | H04L 29/06 709/203 |
| 2007/0011734 A1* | 1/2007 | Balakrishnan | H04L 43/026 726/13 |
| 2009/0077662 A1* | 3/2009 | Law | G05B 19/0426 726/23 |
| 2009/0113542 A1* | 4/2009 | Price | G06F 21/85 726/15 |
| 2009/0126002 A1* | 5/2009 | Vail | H04L 63/0209 726/12 |
| 2009/0319787 A1* | 12/2009 | Price | H04L 63/105 713/166 |
| 2011/0093918 A1* | 4/2011 | Leconte | G06F 21/31 726/2 |
| 2012/0233657 A1* | 9/2012 | Guevin | H04L 63/10 726/1 |
| 2014/0007214 A1* | 1/2014 | Qureshi | G06F 21/10 726/12 |
| 2014/0280914 A1* | 9/2014 | Weinberg | H04L 43/0876 709/224 |

OTHER PUBLICATIONS

Munns, "Supplement 2 to Aring Characteristic 791 Mark I Aviation KU-Band and KA-Band Satellite Communication System", Mar. 14, 2014, pp. 1-70, Publisher: Aeronautical Radio, Inc.

European Patent Office, "Extended European Search Report from EP Application No. 15176505.4 dated Dec. 4, 2015", "from Foreign Counterpart of U.S. Appl. No. 14/336,230", filed Dec. 4, 2015, pp. 1-8, Published in: EP.

European Patent Office, "Communication Pursuant to Article 94(3) for EP Application No. 15176505.4", Foreign Counterpart to U.S. Appl. No. 14/336,230, dated Mar. 14, 2018, pp. 1-5, Published in: EP.

\* cited by examiner

SECURITY ARCHITECTURE FOR THE CONNECTED AIRCRAFT

BACKGROUND

Aircraft servers provide various applications and services to users on board an aircraft. The types of applications and services provided to users, via various user devices, include, but are not limited to, the following: flight functions, cabin functions, weather data applications, in-flight entertainment services, passenger Wi-Fi, etc. These various applications and services are grouped into different avionic domains that have different access requirements, depending on the types of users that will have access to the applications and services. For example, assume the flight crew can have access to the in-flight entertainment system, but the passengers cannot. Further assume that the passengers can have access to the weather data applications. In this example, the in-flight entertainment system can be included in a first avionics domain with a first set of access requirements so that the flight crew can access this first avionics domain, but the passengers cannot. Moreover, the weather data application can be included in a second avionics domain with a second set of access requirements so that the passengers can access the second avionics domain.

SUMMARY

Systems and methods of a security architecture for a connected aircraft are disclosed. In at least one embodiment, an avionics server comprises a plurality of device ports, wherein each of the plurality of device ports is coupled to a respective one of a plurality of device network interface cards and dedicated to a respective one of a plurality of avionics domains which corresponds to the respective device network interface card. Further, at least one processing device is configured to identify one or more signals from a respective user received at one or more of the plurality of device ports and to verify whether the user has access to the respective avionics domains that are dedicated to the one or more device ports over which the one or more signals are received.

DRAWINGS

Figure 2:
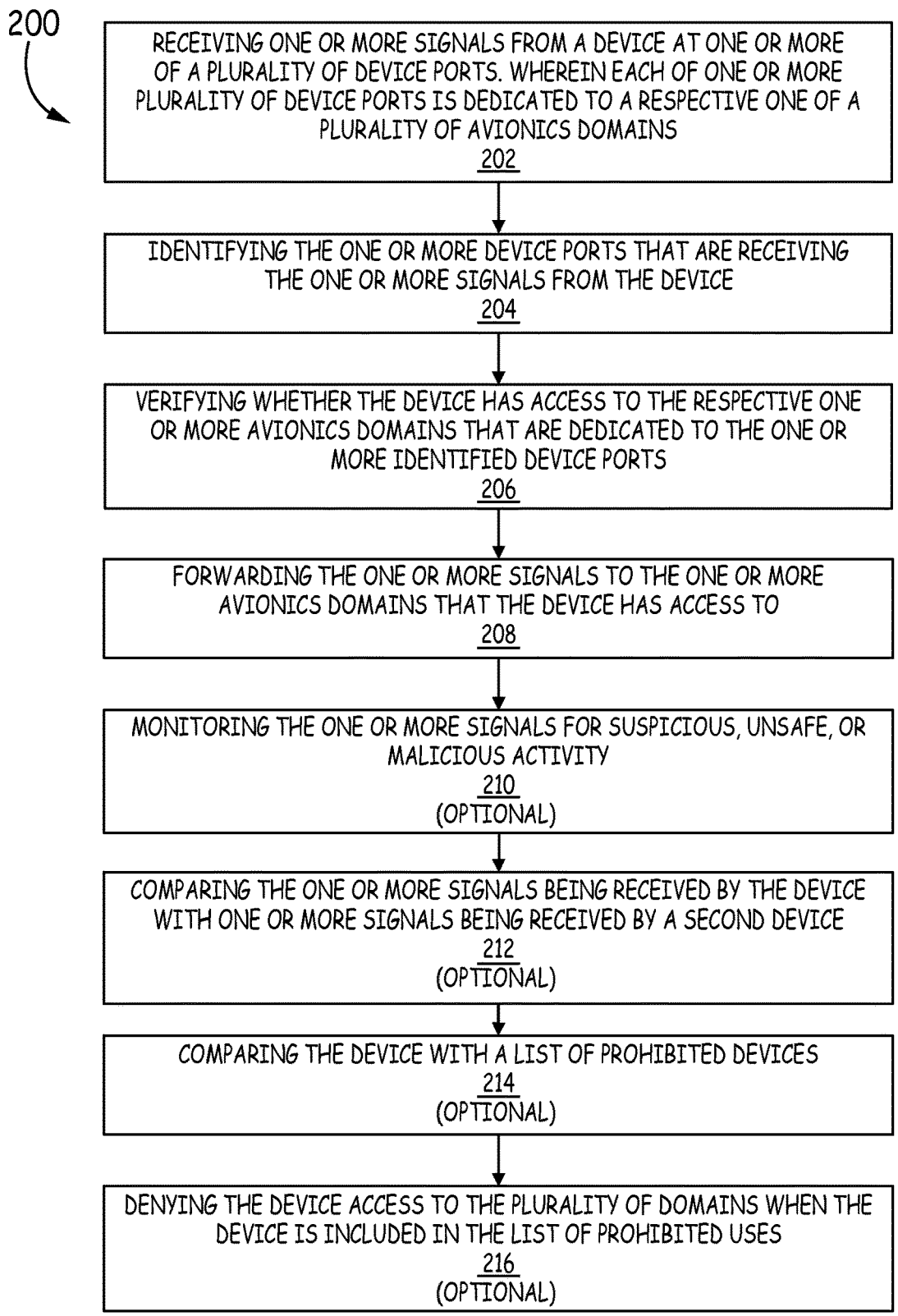

Understanding that the drawings depict only exemplary embodiments and are not therefore to be considered limiting in scope, the exemplary embodiments will be described with additional specificity and detail through the use of the accompanying drawings, in which:

FIG. 1 is a block diagram of an example security architecture for a server on board an aircraft; and FIG. 2 is a flow diagram of an example method to improve the security architecture of a server on board an aircraft.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As discussed above, different domains allow different users to have access to the various respective server applications and services included in each of the domains. In conventional architectures for avionics servers, one or more switches control the flow of signals sent from a user device to more than one domain. More specifically, a user device sends a signal to a network interface card. The network interface card is coupled to a switch that will direct the signal to the more than one domain. For example, in one embodiment, if a passenger is attempting to access the avionics domain that includes the weather data application, a signal is sent to a network interface card that is coupled to a switch. The switch will then route the signal from the passenger's device to the domain that includes the weather data application. Further, that same switch can receive signals sent from a flight crew device to the same network interface card. The switch will then route that signal to the domain that includes the in-flight entertainment system. While there is some security to this approach, this architecture is not as secure as it should be. The reason being is because a user may be able to manipulate the switch into sending the signals from the user's device to a domain that is different from the one it is supposed to be directed to. By redirecting the signal, a user can potentially cause harm to the server. For example, in this instance where the signal was redirected to the in-flight entertainment system, a passenger could potentially use the entertainment system to publish messages that might incite fear, panic, or anger, such as the posting of false messages from the pilot ordering all passengers to move to the rear of the plane, which could shift the center of gravity sufficiently to crash the aircraft.

The embodiments discussed in this disclosure enhance the security of the architecture for avionics servers by removing the switches that direct signals between more than one avionics domain. Specifically, the embodiments in this disclosure have a plurality of device network interface cards each coupled to a respective one of a plurality of device ports on the avionics server. Further, each of the plurality of device ports is dedicated to a respective one of a plurality of avionics domains which corresponds to the respective device network interface card. As a result, any signals sent to or received from an avionics domain on the avionics server will go through the one device port. Therefore, the avionics server can be configured to identify the specific device port that a user is sending signals to and verify whether the user has access to the respective avionic domains that are dedicated to the one or more device ports over which the user is sending signals to. This enables more robust firewalls and threat tracking for avionics servers than directing signals via switches to the various domains, as described in more detail below. The terms "avionics domain" and "domain" will be used interchangeable throughout this disclosure. Further, the terms "avionics server" and "server" will be used interchangeably throughout this disclosure.

FIG. 1 is a block diagram of an example system 100 that includes a security architecture for an aircraft server 102. In some embodiments, the at least one avionics server 102 is an application computing platform on board an aircraft. The avionics server 102 can include any number of virtual machines, which enable the hosting of different operating systems (OS). Within these OS's, different applications and services 110A-110C can be used by different devices 120A-

120C. Each of the applications and services 110A-110C are grouped into different domains 108A-108C, which have different access requirements. The applications and services 110A-110C can include, but are not limited to, flight functions, cabin functions, weather data applications, in-flight entertainment services, and passenger Wi-Fi, for on-board devices 120A-120C. Examples of the on-board devices 120A-120C that access the applications and services 110A-110C include, but are not limited to: pilot and crew devices, such as flight management computer (FMC), control management unit (CMU), and the in-flight entertainment system (IFL); WiFi access points; and passenger devices, such as laptops, tablets, and mobile phones.

To provide data services for on-board devices 120A-120C, the avionics server 102 receives signals from a datalink 104. In some embodiments, the datalink 104 can send and receive signals using various satellite communication protocols including, but not limited to, Inmarsat, Iridium, Thuraya, and Multi-function Transport Satellite (MTSAT) as well as future systems such as Iris, Aeronautical Mobile Airport Communications System (AeroMACS) and Iridium NEXT. The signals from the datalink 104 can then be sent to a datalink port 107 via a datalink network interface card 106. The processing device 116 can then direct the signal from the datalink port 107 to the appropriate domain 108A-108C, depending on the content of the signal.

As stated above, a server has a plurality of domains 108A-108C, wherein each domain 108A-108C includes a group of respective applications and services 110A-110C, such as flight functions, cabin functions, weather data applications, in-flight entertainment services, passenger Wi-Fi, etc., for use by user devices 120A-120C. Each domain 108A-108C has different access requirements depending on the types of users that should have access to the respective applications and services 110A-110C that are included in each domain 108A-108C. To restrict access and protect the respective applications and services 110A-110C in each domain 108A-108C, separate firewalls 112A-112C and differing passwords can be included in the server 102 for each domain 108A-108C. For example, each of the domains 108A-108C could have a Wi-Fi Protected Access II (WPA2) encrypted sign on requirement. This contrasts with conventional implementations where there is not a dedicated firewall for each domain 108A-108C. As a result, there is more flexibility in the embodiments of this disclosure than in conventional implementations, as discussed below. Throughout this disclosure, the term "domain" will also refer to the respective applications and services included in the domain.

Some example domains include, but are not limited to, the following: an aircraft control domain (ACD), an airline information services domain (AISD), a passenger information and entertainment service domain (PIESD) and a passenger owned devices domain (PODD). In some embodiments, one or more or more of these domains can be included in the domains 108A-108C. The ACD includes applications and services whose primary function is to control the aircraft, such as flight control functions and navigation systems. In some embodiments, ACD can perform non-safety related functions, as well. As mentioned above, in some embodiments, ACD can be included in the domains 108A-108C, and as a result, on the same server 102 as other domains; however, in other exemplary embodiments, the ACD will not be located on the same server 102 as other domains for safety reasons. The AISD includes applications and services used by the cabin crew, such as cabin operation, flight support, cabin maintenance and administrative support. The PIESD can include applications and services for passenger entertainment, such as services for the in-flight entertainment (IFE) systems, and network services. The PODD is a domain that provides applications and services, such as Wi-Fi, for devices that passengers may bring on board, such as laptops, tablets and smartphones. As stated above, each of the different domains 108A-108C has different access requirements. For example, only pilots may be able to access the ACD, while the pilots and the flight crew can access the AISD and PIESD. Whereas, the passengers are only able to access the PODD.

To further enhance the security of the domains 108A-108C, the avionics server 102 includes a plurality of device ports 114A-114C. Each of the plurality of device ports 114A-114C is coupled to a respective one of a plurality of device network interface cards (device NICs) 118A-118C and dedicated to a respective one of the domains 108A-108C which corresponds to the respective device NICs 118A-118C. Stated another way, each of the domains 108A-108C is accessed via a single device NIC 118A-118C, which is coupled to a single respective device port 114A-114C for the domain 108A-108C that is trying to be accessed. In some embodiments, the device NICs 118A-118C can be included in the avionics server 102.

Since each of the domains 108A-108C is accessed by a respective device NIC 118A-118C, Open Systems Interconnection model (OSI) layer 1 and layer 2 security techniques can be used to track users' signals, such as media access control (MAC) address tracking. Since the system is able to track the users, the users can be segregated to a specific domain. In contrast, for conventional implementations, a switch is used to direct signals to different domains 108A-108C. The switches, however, can be circumvented through techniques such as internet protocol (IP) address spoofing. However, in the current implementations, IP address checking can be used as well.

Moreover, due to this architecture, a processing device 116 in the server 102 can be configured to identify what specific device port 114A-114C that the user's signals came from and verify whether the user has access to the respective domain 108A-108C. If a user then tries to go from a first domain 108A-108C to a different second domain 108A-108C, the processing device 116 can be configured to deny that user access to the second domain 108A-108C based on the user accessing the first domain 108A-108C via the first device port 114-114C and respective device NIC 118A-118C. This is not possible in conventional implementations where signals for more than one domain 108A-108C come in on the same server device port via a single device NIC and then routed to the correct domain by a switch. In some embodiments, the processing device 116 can include a central processing unit (CPU), microcontroller, microprocessor (e.g., a digital signal processor (DSP)), field programmable gate array (FPGA), application specific integrated circuit (ASIC), or other processing device.

In some embodiments, the processing device 116 can be further configured to monitor the one or more signals for suspicious, unsafe, or malicious activity. For example, the processing device 116 can be configured to record the signals being received at one or more of the plurality of device ports 114A-114C, associate the signals with the devices' 120A-120C respective IP addresses and/or MAC addresses and observe any behavior that might be suspicious. In some embodiments, the logged signals and observed behavior can be reported to a ground station. In some embodiments, the logged signals received from one device 120A-120C can be compared to logged signals received by other devices 120A-120C on the same aircraft or other aircrafts and the processing device can search for patterns of suspicious activity. If suspicious activity is discovered, the IP and MAC addresses associated with that device can be denied access to the server 102. Moreover, if one of the domains 108A-108C, in particular, is being sent malicious signals, the processing device 116 can be configured to disable the respective device NIC 118A-118C and device port 114A-114C for that one domain 108A-108C. In conventional implementations, an avionics server 102 is capable of denying service to a specific device 120A-120C; however, denying service to an entire domain 108A-108C is much more difficult since more than one domain 108A-108C receives signals via a single device port 114A-114C and/or device NIC 118A-118C. So, if that single device port 114A-114C and device NIC 118A-118C were disabled, more than just the one domain 108A-108C that was being targeted would be disabled.

In some embodiments, the processing device 116 can be further configured to compare a user and/or device 120A-120C with a list of prohibited users and/or devices 120A-120C. In some embodiments, the list of prohibited users and/or devices can be provided by different authorities or extrapolated from the monitoring activity discussed above. In some of these embodiments, the processing device 115 can be configured to deny and/or limit a device 120A-120C access to the server 102 if the device 120A-120C is on the prohibited list of devices. In some embodiments, the device 120A-120C can be on-board the aircraft with avionics server 102, and in other embodiments, the device 120A-120C can be located on the ground or on another aircraft.

FIG. 2 is a flow diagram of an example method 200 to improve the security of an avionics server. The method 200 comprises receiving one or more signals from a device at one or more of a plurality of device ports, wherein each of one or more plurality of device ports is dedicated to a respective one of a plurality of avionics domains (block 202). In some embodiments, the plurality of device ports can have some or all of the same characteristics as the plurality of device ports 114A-114C discussed above in FIG. 1. Similarly, the plurality of avionics domains can have some or all of the same characteristics as the plurality of avionic domains 108A-108C discussed above. For example, the plurality of avionics domains can include the domains discussed above, i.e., the ACD, AISD, PIESD and PODD. The signals received by one or more of a plurality of device ports can be from devices such as the ones discussed above, i.e., pilot and crew devices, such as flight management computer (FMC), control management unit (CMU), the in-flight entertainment system (IFL), WiFi access points and passenger devices, such as laptops, tablets and mobile phones.

Next, method 200 includes identifying the one or more device ports that are receiving the one or more signals from the device (block 204). In some embodiments, each of the plurality or device ports is coupled to a respective one of a plurality of device network interface cards (NICs). As a result, one can identify which of the device NICs that a device is using to send signals to the plurality of device ports. This has the same advantages as discussed above under FIG. 1. Namely, being able to restrict a device access to other domains based on identifying that the device accessed a first domain via a first device port.

Further, method 200 includes verifying whether the device has access to the respective one or more avionics domains that are dedicated to the one or more identified device ports (block 206). Similar to above, this can be done using a WPA2 encrypted sign on. Additionally, a separate firewall can be configured for each domain. Once a device's access has been verified, method 200 includes forwarding the one or more signals to the one or more avionics domains that the device has access to (block 208).

In some embodiments, method 200 can further comprise monitoring the one or more signals for suspicious, unsafe or malicious activity (block 210). For example, in some embodiments, if a device is sending one or more signals to one of the domains, the device's IP address and/or MAC address can be recorded and the signals that the device is sending can be observed. In some embodiments, the signals from the device can be compared to signals received by other devices (block. 212). In some other embodiments, the signals received from a device can be compared to signals received from a different avionics server. In both of these embodiments, patterns of suspicious activity can be searched for based on the comparison of the signals. Similar to the monitoring done by the processing device 116 above, if suspicious activity is discovered, the IP and MAC addresses associated with that device can be denied access to the server. Also, if one of the domains is being sent malicious signals, the method 200 can include disabling the respective device port and device NIC for the domain that is being attacked. This can be done using the embodiments described in this method 200 much easier than can be done in conventional implementations.

In some embodiments, method 200 can further comprise comparing the devices with a list of prohibited devices (block 214). Similar to above, the list of prohibited users/ devices can be provided by different authorities or extrapolated from the monitoring activity discussed above in method 200. In some of these embodiments, method 200 can include denying the device access to the domains when the device is included in the list of prohibited uses (block 216). The user and/or device can be on-board in some embodiments, and in other embodiments, the user and/or device can be located on the ground or on another aircraft.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. An avionics server comprising:
   a plurality of domains, wherein each one of the plurality of domains comprises a separate dedicated firewall restricting access to a plurality of applications and/or services on each one of the plurality of domains;
   a plurality of device ports, wherein each one of the plurality of device ports is dedicated to a single respective one of the plurality of domains;
   a plurality of device network interface cards, wherein each one of the plurality of device network interface cards is coupled to a single respective one of the plurality of device ports; and
   at least one processing device configured to identify one or more signals from a respective user device received, via the respective plurality of device network interface cards, at one or more of the plurality of device ports and to verify, by the respective dedicated firewall, whether the user has access to the respective domains that are dedicated to the one or more device ports over which the one or more signals are received.

2. The avionics server of claim 1, wherein the plurality of domains includes one or more of the following domains: an aircraft control domain, an airline information services domain, a passenger information and entertainment service domain, or a passenger owned devices domain.

3. The avionics server of claim 1, wherein the at least one processing device is further configured to monitor the one or more signals for suspicious, unsafe, or malicious activity.

4. The avionics server of claim 1, wherein the at least one processing device is further configured to compare the one or more signals being received from the user with one or more signals being received from a second user.

5. The avionics server of claim 1, wherein the at least one processing device is further configured to:
compare the user with a list of prohibited users and deny the user access to the avionics server when the user is included in the list of prohibited users.

6. The avionics server of claim 1, further comprising a datalink port and a datalink network interface card for receiving signals via a datalink and wherein the at least one processing device is configured to direct the signals from the datalink port to a corresponding domain.

7. The avionics server of claim 1, wherein the avionics server includes the plurality of device network interface cards.

8. The avionics server of claim 1, wherein the avionics server is an application computing platform including one or more virtual machines hosting the plurality of applications and/or services.

9. A method comprising:
receiving one or more signals from a device at one or more of a plurality of device ports, via a respective plurality of device network interface cards, wherein each one of the plurality of device ports is coupled to a single respective one of the plurality of device network interface cards, and wherein each one of the plurality of device ports is dedicated to a single respective one of a plurality of domains;
identifying the one or more device ports that are receiving the one or more signals from the device;
verifying, by a separate respective dedicated firewall on each one of the plurality of domains, whether the device has access to the respective one or more domains that are dedicated to the one or more identified device ports; and
forwarding the one or more signals to the one or more domains that the device has access to.

10. The method of claim 9, wherein the plurality of domains include one or more of the following domains: an aircraft control domain, an airline information services domain, a passenger information and entertainment service domain, or a passenger owned devices domain.

11. The method of claim 9, further comprising monitoring the one or more signals for suspicious, unsafe, or malicious activity.

12. The method of claim 9, further comprising comparing the one or more signals being received by the device with one or more signals being received by a second device.

13. The method of claim 9, further comprising comparing the device with a list of prohibited devices.

14. The method of claim 13, further comprising denying the device access to the plurality of domains when the device is included in the list of prohibited devices.

15. A system comprising:
a plurality of device network interface cards; and
an avionics server comprising:
a plurality of domains, wherein each one of the plurality of domains comprises a separate dedicated firewall restricting access to a plurality of applications and/or services on each one of the plurality of domains; and
a plurality of device ports, wherein each one of the plurality of device ports is dedicated to a single respective one of the plurality of domains;
wherein each one of the plurality of device ports is coupled to a single respective one of the plurality of device network interface cards, which corresponds to the respective domain, and
wherein the avionics server is configured to identify one or more signals from a respective user device received, via the respective plurality of device network interface cards, at one or more of the plurality of device ports, and to verify, by the respective dedicated firewall, whether the user has access to the respective domains that are dedicated to the one or more device ports over which the one or more signals are received.

16. The system of claim 15, wherein the plurality of domains includes one or more of the following domains: an aircraft control domain, an airline information services domain, a passenger information and entertainment service domain, or a passenger owned devices domain.

17. The system of claim 15, wherein the avionics server is further configured to monitor the one or more signals for suspicious, unsafe, or malicious activity.

18. The system of claim 15, wherein the avionics server is further configured to compare the one or more signals being received from the user with one or more signals being received from a second user.

19. The system of claim 15, wherein the avionics server is further configured to compare the user with a list of prohibited users.

20. The system of claim 19, wherein the avionics server is further configured to deny the user access to the avionics server when the user is included in the list of prohibited users.

* * * * *